US011206723B2

(12) United States Patent
Sagawa et al.

(10) Patent No.: US 11,206,723 B2
(45) Date of Patent: Dec. 21, 2021

(54) REMOTE CONTROL DEVICE, COMMUNICATION DEVICE, VARIABLE DEVICE AND LIGHTING DEVICE

(71) Applicant: MINEBEA MITSUMI Inc., Nagano (JP)

(72) Inventors: Yoshihiro Sagawa, Iwata (JP); Hideaki Kawauchi, Atsugi (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/965,404

(22) PCT Filed: Dec. 17, 2018

(86) PCT No.: PCT/JP2018/046293
§ 371 (c)(1),
(2) Date: Jul. 28, 2020

(87) PCT Pub. No.: WO2019/150795
PCT Pub. Date: Aug. 8, 2019

(65) Prior Publication Data
US 2021/0076473 A1    Mar. 11, 2021

(30) Foreign Application Priority Data

Jan. 31, 2018   (JP) .............................. JP2018-014914

(51) Int. Cl.
*H05B 47/10*    (2020.01)
*H04Q 9/02*    (2006.01)
(52) U.S. Cl.
CPC .............. *H05B 47/10* (2020.01); *H04Q 9/02* (2013.01)
(58) Field of Classification Search
CPC ............. H05B 47/10; H04Q 9/02; H04Q 9/00
See application file for complete search history.

(56) References Cited

U.S. PATENT DOCUMENTS 5,113,438 A * 5/1992 Blokker, Jr. ........... G08C 23/04
398/1
5,379,453 A * 1/1995 Tigwell .................. G08C 17/02
340/12.28
(Continued)

FOREIGN PATENT DOCUMENTS

CN       1782970 A    6/2006
CN     102333400 A    1/2012
(Continued)

OTHER PUBLICATIONS

International Search Report for corresponding International Application No. PCT/JP2018/046293 dated Feb. 12, 2019.
(Continued)

*Primary Examiner* — Ojiako K Nwugo
(74) *Attorney, Agent, or Firm* — Pearne & Gordon LLP

(57) ABSTRACT

To provide a remote control device for transmitting a light signal having a pulse pattern capable of reducing the possibility of false detection, a communication device including the remote control device and a sensor, a variable device further including an appliance whose state varies by tracking the remote control device, and a lighting device further including a moving light for illuminating the remote control device by tracking the remote control device. The remote control device transits a light signal having a pulse pattern to be detected by a sensor, in which the pulse pattern includes a first ON period, a second ON period, and an OFF period between the first ON period and the second ON period, the first ON period and the second ON period being repeated alternately, the first ON period and the second ON period are more than twice as long as a sampling time T of the sensor, the first ON period and the second ON period are different from each other, and the OFF period is longer than the sampling time T.

8 Claims, 7 Drawing Sheets

(56) References Cited

U.S. PATENT DOCUMENTS

| | | | | |
|---|---|---|---|---|
| 6,430,358 | B1* | 8/2002 | Yuen | G11B 15/026 |
| | | | | 386/200 |
| 8,804,483 | B2* | 8/2014 | Shi | H04L 25/00 |
| | | | | 370/213 |
| 2001/0024566 | A1* | 9/2001 | Mankovitz | H04N 5/7755 |
| | | | | 386/200 |
| 2004/0107442 | A1* | 6/2004 | Bayley | H03G 3/02 |
| | | | | 725/93 |
| 2005/0049488 | A1* | 3/2005 | Homan | A61B 1/041 |
| | | | | 600/431 |
| 2006/0120726 | A1 | 6/2006 | Yoshifusa | |
| 2007/0285277 | A1* | 12/2007 | Scott | G08B 13/2471 |
| | | | | 340/870.26 |
| 2011/0038309 | A1* | 2/2011 | Shi | H04L 25/00 |
| | | | | 370/328 |
| 2011/0285515 | A1 | 11/2011 | Fushimi et al. | |
| 2014/0301737 | A1 | 10/2014 | Guo et al. | |
| 2014/0313146 | A1* | 10/2014 | Munechika | G06F 3/04166 |
| | | | | 345/173 |
| 2014/0372072 | A1 | 12/2014 | Guo et al. | |
| 2016/0269112 | A1 | 9/2016 | Guo et al. | |
| 2017/0031002 | A1* | 2/2017 | Newton | G01S 7/021 |
| 2017/0104534 | A1* | 4/2017 | Orion | H04B 10/1143 |
| 2017/0182322 | A1* | 6/2017 | Grill | A61N 1/36132 |
| 2018/0087930 | A1* | 3/2018 | Motz | G01R 31/2884 |

FOREIGN PATENT DOCUMENTS

| | | |
|---|---|---|
| CN | 103383446 A | 11/2013 |
| EP | 2 391 189 A1 | 11/2011 |
| JP | 56-36887 A | 4/1981 |
| JP | 05-020904 A | 1/1993 |
| JP | 2011-249053 A | 12/2011 |

OTHER PUBLICATIONS

Written Opinion for corresponding International Application No. PCT/JP2018/046293 dated Feb. 12, 2019.

English translation of the Written Opinion for corresponding International Application No. PCT/JP2018/046293 dated Feb. 12, 2019.

International Preliminary Report on Patentability for corresponding International Application No. PCT/JP2018/046293 dated Aug. 4, 2020.

Extended European Search Report dated Sep. 15, 2021 for corresponding European Application No. 18903878.9.

English translation of Chinese Office Action dated Oct. 15, 2021 for corresponding Chinese Application No. 201880087844.0 (original document Previously Submitted on IDS filed Nov. 2, 2021).

Office Action dated Oct. 15, 2021 for corresponding Chinese Application No. 201880087844.0 (translation to follow).

Notice of Allowance dated Oct. 27, 2021 for corresponding Japanese Application No. 2018-014914 and English translation.

\* cited by examiner

REMOTE CONTROL DEVICE, COMMUNICATION DEVICE, VARIABLE DEVICE AND LIGHTING DEVICE

TECHNICAL FIELD

The present invention relates to a remote control device for transmitting a light signal having a pulse pattern to be detected by a sensor, a communication device including the remote control device and a sensor, a variable device further including an appliance whose state varies by tracking the remote control device, and a lighting device further including a moving light for tracking and illuminating the remote control device.

BACKGROUND ART

A technique is proposed in which, when a speaker carrying a remote control device for transmitting an infrared signal moves on a stage in a theater, a lecture hall, or the like, the infrared signal is detected so that a moving light illuminates the speaker by tracking the speaker (for example, Patent Literature 1).

DOCUMENT LIST

Patent Literature

Patent Literature 1: Japanese Patent Application Publication No. H05-20904

SUMMARY OF INVENTION

Technical Problem

If a plurality of speakers each carrying remote control devices are on the stage, it is necessary to distinguish and detect signals from the respective remote control devices. In this regard, a case where signals transmitted by two remote control devices are detected by a CMOS sensor is hereinafter considered.

As illustrated in FIG. 1(a), the CMOS sensor scans from a coordinate (0, 0) to a coordinate (X, Y) in a direction indicated by an arrow. Here, as illustrated in FIG. 1(b), when the CMOS sensor detects a signal (light source A) from a first remote control device at a coordinate (X1, Y1), a label 1 is allocated to the detected signal (light source A), and when the CMOS sensor detects a signal (light source B) from a second remote control device at a coordinate (X2, Y2), a label 2 is allocated to the detected signal (light source B). Thereafter, as illustrated in FIG. 1(c), when the light source A is turned off, the CMOS sensor sets the label 1 to a dead number. Thereafter, as illustrated in FIG. 1(d), when the light source A is turned on, the CMOS sensor allocates the label 1 to the light source A again. In this case, the label 1 is constantly allocated to the light source A and the label 2 is constantly allocated to the light source B, and thus no problem occurs.

However, in the case illustrated in FIGS. 1(e) and 1(f) after FIG. 1(b), a problem to be described below occurs.

After FIG. 1(b), as illustrated in FIG. 1(e), when both the light source A and the light source B are turned off, the CMOS sensor sets the labels 1 and 2 to dead numbers. Thereafter, as illustrated in FIG. 1(f), when the light source B is turned on, the CMOS sensor allocates the label 1 to the light source B. In this case, although the label 2 is first allocated to the light source B, the label 1 is allocated when the light source B is turned off and then is turned on again, and thus the CMOS sensor erroneously detects the light source A in place of the light source B. In other words, the CMOS sensor erroneously detects the first remote control device and the second remote control device as each other.

In view of the above-described problem, it is an object of the present invention to provide a remote control device for transmitting a light signal having a pulse pattern capable of reducing the possibility of false detection, a communication device including the remote control device and a sensor, a variable device further including an appliance whose state varies by tracking the remote control device, and a lighting device further including a moving light for tracking and illuminating the remote control device.

Solution to Problem

A remote control device according to the present invention transmits a light signal having a pulse pattern to be detected by a sensor, in which the pulse pattern includes a first ON period, a second ON period and an OFF period between the first ON period and the second ON period, the first ON period and the second ON period being repeated alternately, the first ON period and the second ON period are more than twice as long as a sampling time T of the sensor, the first ON period and the second ON period are different from each other, and the OFF period is longer than the sampling time T.

In the remote control device according to the present invention, it is preferable that the first ON period and the second ON period be $(n+0.5) \times T$ and the OFF period be 1.5 T, where T is the sampling time and n is an integer of 2 or more.

A communication device according to the present invention includes:

the remote control device; and a sensor for detecting a light signal transmitted by the remote control device.

In the communication device according to the present invention, it is preferable for the sensor to assume a period including two of the first ON periods and two of the second ON periods to be one cycle.

In the communication device according to the present invention, it is preferable for the sensor to detect the light signal based on a detected area of a light source or a change rate of a coordinate.

A variable device according to the present invention includes:

the communication device; and an appliance whose state varies by tracking the remote control device based on information from the sensor.

A lighting device according to the present invention includes:

the communication device; and a moving light for tracking and illuminating the remote control device based on information from the sensor.

In the lighting device according to the present invention, it is preferable for the moving light to disregard the detected light signal when direction information about a tilt exceeds a predetermined threshold.

DESCRIPTION OF EMBODIMENTS

Figure 2:
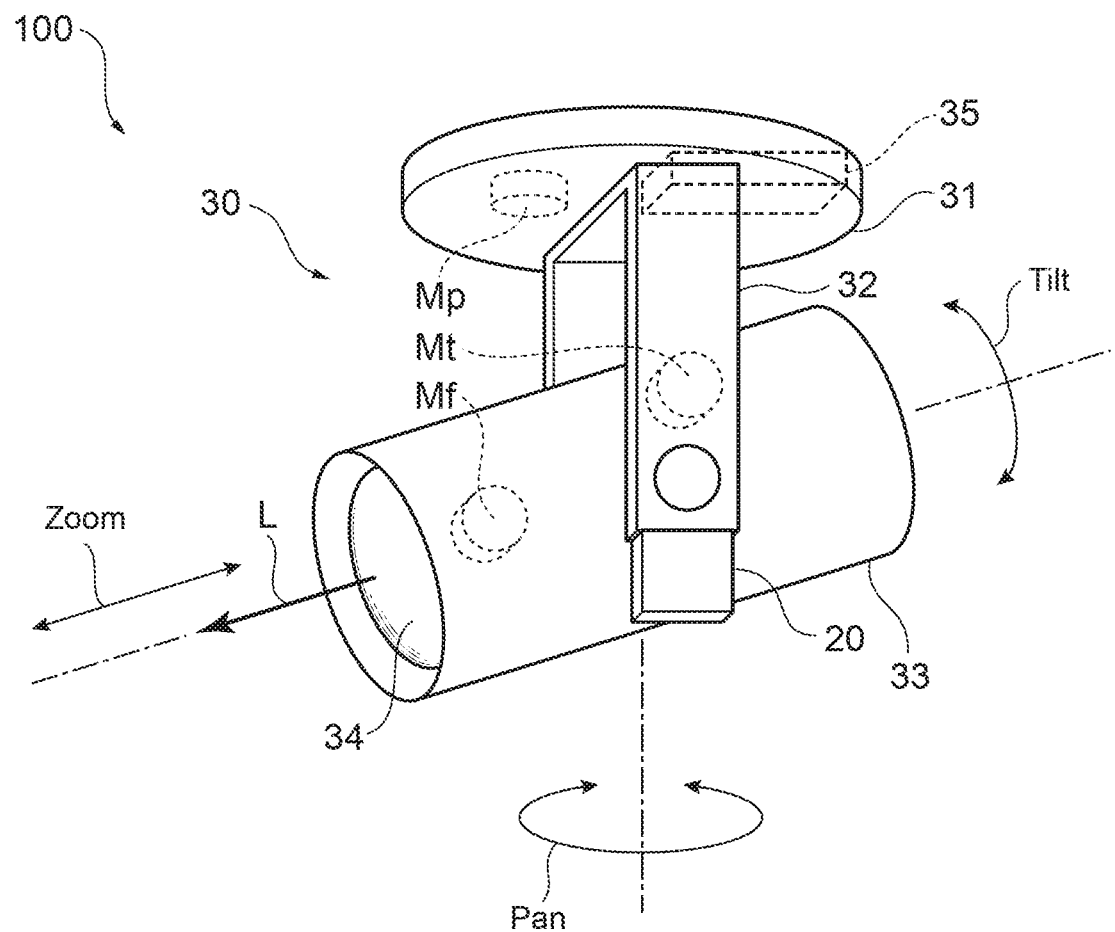
FIG. 2 A perspective view of a lighting device according to the present invention.
Figure 2:
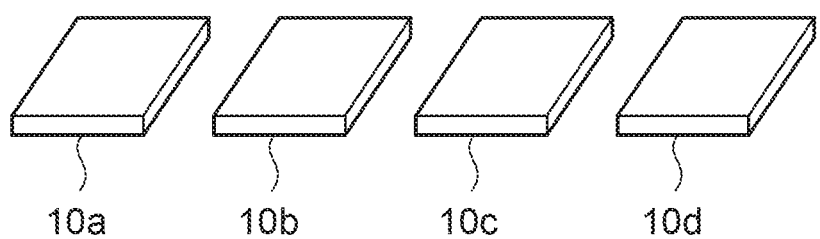

FIG. 2 is a perspective view of a lighting device according to the present invention.

A lighting device 100 includes four remote control devices 10a to 10d, a sensor 20 which is, for example, a CMOS sensor 20, and a moving light 30. Hereinafter, when the remote control devices 10a to 10d are not particularly distinguished, the remote control devices 10a to 10d are simply referred to as the remote control device 10. A light signal (for example, a pulse signal of light having any wavelength range, such as an infrared signal, a visible light signal, or an ultraviolet light signal) from each remote control device 10 is received by the CMOS sensor 20, and the moving light 30 is controlled to track and illuminate the remote control device 10 that has transmitted the signal.

Herein, a device including the remote control device 10 and the CMOS sensor 20 is referred to as a communication device.

Figure 3:
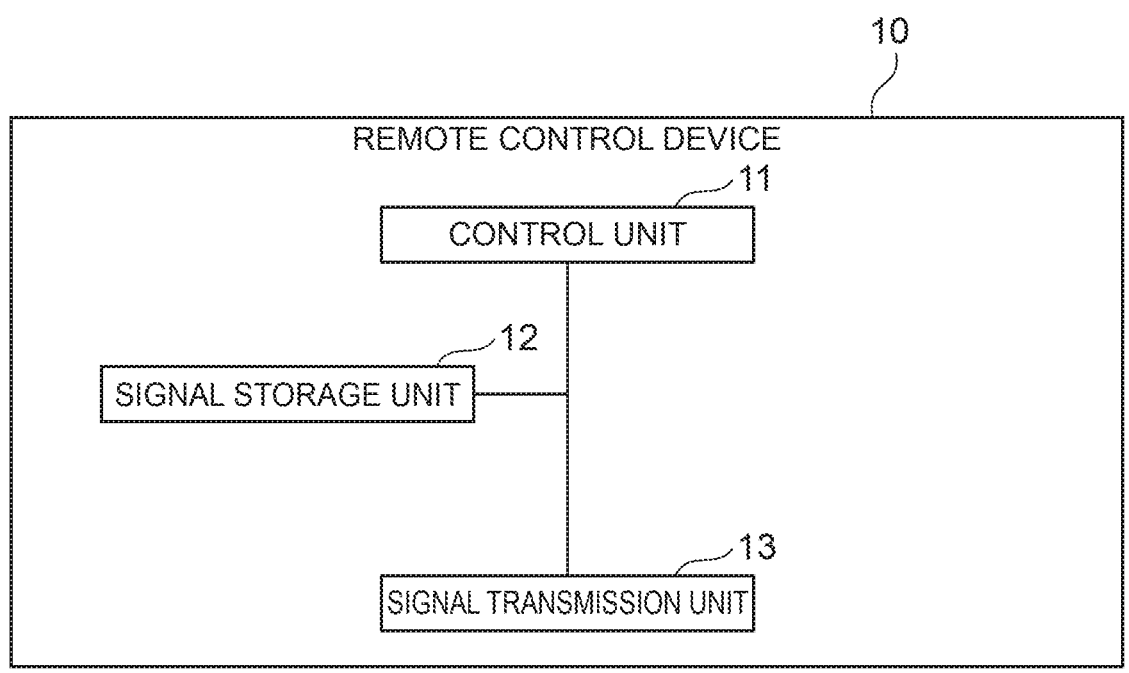
FIG. 3 A block diagram of a remote control device.

FIG. 3 is a block diagram of the remote control device.

The remote control device 10 includes a control unit 11, a signal storage unit 12 and a signal transmission unit 13. Upon detecting that a user has turned on a power supply of the remote control device 10, the control unit 11 transmits a signal as the light signal based on a signal pattern stored in the signal storage unit 12 through the signal transmission unit 13. As described below with reference to FIG. 6, the signal patterns stored in the signal storage unit 12 are unique for each of the remote control devices 10a to 10d (i.e., the signal patterns stored in the signal storage unit 12 are different in the respective remote control devices 10a to 10d).

The remote control devices 10a to 10d are used such that, for example, the remote control devices 10a to 10d are held by four users, respectively, with their hands, or are attached to the clothes or the like of the respective users.

Figure 4:
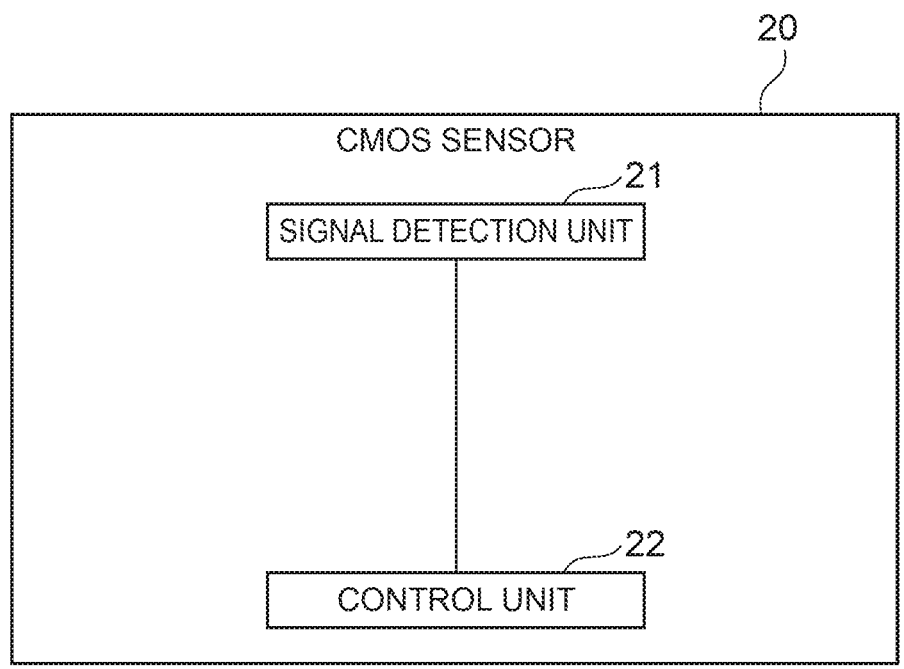
FIG. 4 A block diagram of the CMOS sensor.

FIG. 4 is a block diagram of the CMOS sensor.

Figure 1A:
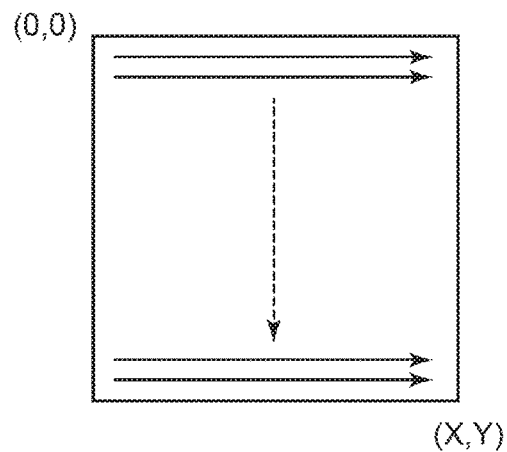
FIG. 1 A diagram for explaining an operation of a CMOS sensor.
Figure 1B:
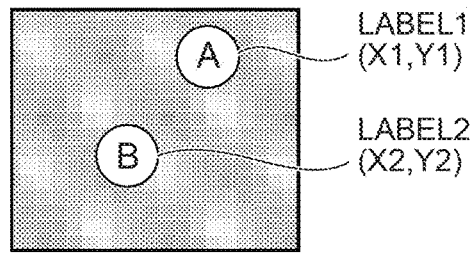
Figure 1C:
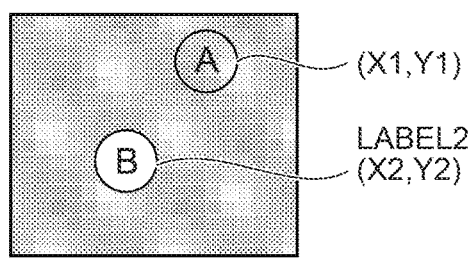
Figure 1E:
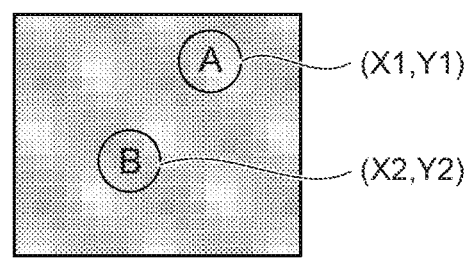
Figure 1D:
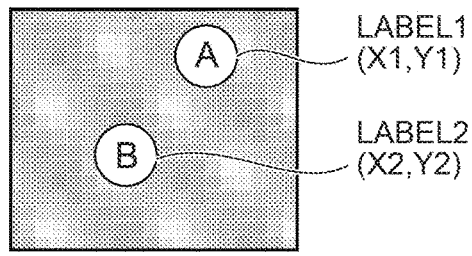
Figure 1F:
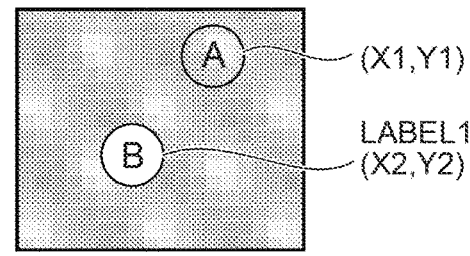

The CMOS sensor 20 includes a signal detection unit 21 and a control unit 22. The signal detection unit 21 detects signals from the remote control devices 10a to 10d. Specifically, as described above with reference to FIG. 1(a), the signal detection unit 21 scans from a coordinate (0, 0) to a coordinate (X, Y). A CMOS sampling time (a time required for scanning from the coordinate (0, 0) to the coordinate (X, Y)) is, for example, 8 ms, but any time can be set as the sampling time. Here, as illustrated in FIG. 1(b), the CMOS sensor detects the signal (light source A) from the remote control device 10a at a coordinate (X1, Y1) and detects the signal (light source B) from the remote control device 10b at a coordinate (X2, Y2). Note that for simplicity of explanation, the illustration of the signals from the remote control devices 10c and 10d is omitted.

Thereafter, the control unit 22 allocates labels to signals detected at each sampling time in the order of scanning. In the case of FIG. 1(b), a label 1 is allocated to the signal (light source A) from the remote control device 10a, and a label 2 is allocated to the signal (light source B) from the remote control device 10b. The control unit 22 transmits label information to the moving light 30 by a wired connection or a wireless connection. The label information includes coordinate (position) information of the light sources to which the labels are allocated.

Referring again to FIG. 2, the configuration and operation of the moving light will be described.

The moving light 30 includes a clockwise/counterclockwise rotation unit 31, an arm 32 fixed to a lower side of the clockwise/counterclockwise rotation unit 31, a hood 33 held by the arm 32 and a lighting appliance 34 placed inside the hood 33.

The clockwise/counterclockwise rotation unit 31 includes a pan motor Mp and a variable control unit 35. The clockwise/counterclockwise rotation unit 31 is connected to a fixing portion of a ceiling and configured to be rotatable clockwise or counterclockwise by the pan motor Mp. Further, the clockwise/counterclockwise rotation unit 31 can hold the arm 32 and pan an illumination direction L of the lighting appliance 34 in a left-right direction by the rotation of the pan motor Mp.

The hood 33 is held by the arm 32 and configured to be rotatable upward or downward by a tilt motor Mt attached to the arm 32. The illumination direction L of the lighting appliance 34 can be tilted up and down by the rotation of the tilt motor Mt. The hood 33 is configured to be able to adjust a focal length of the lighting appliance 34 using the focus motor Mf and a lens which is not illustrated.

Figure 5:
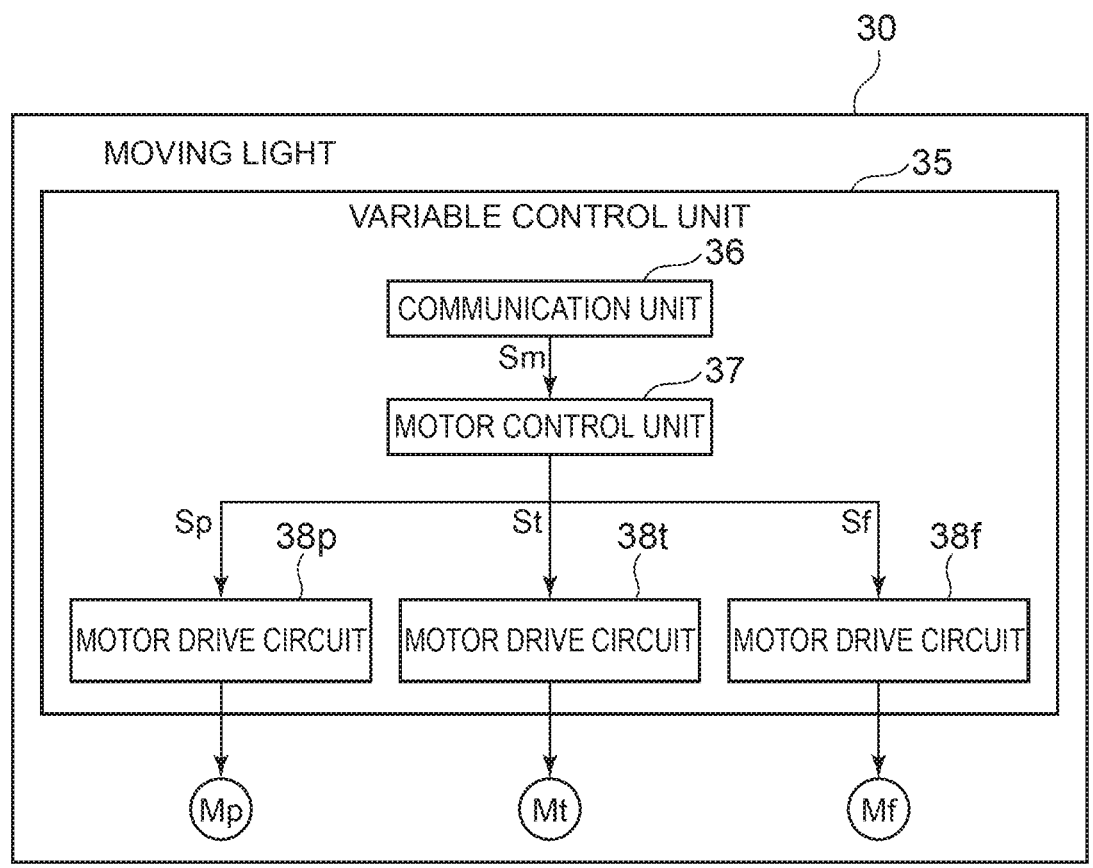
FIG. 5 A block diagram of a moving light.

FIG. 5 is a block diagram of the moving light.

The variable control unit 35 includes a communication unit 36 for receiving label information from the CMOS sensor 20, a motor control unit 37 for controlling the motor, and motor drive circuits 38p, 38t and 38f. The variable control unit 35 variably controls the rotational speed of each of the pan motor Mp, the tilt motor Mt and the focus motor Mf. Hereinafter, when the motor drive circuits 38p, 38t and 38f are not particularly distinguished, the motor drive circuits 38p, 38t and 38f are simply referred to as the motor drive circuit 38, and when the pan motor Mp, the tilt motor Mt and the focus motor Mf are not particularly distinguished, the pan motor Mp, the tilt motor Mt and the focus motor Mf are simply referred to as the motor M.

The communication unit 36 receives label information from the CMOS sensor 20 by a wired connection or a wireless connection, and outputs a reception signal Sm based on the label information. The communication unit 36 decodes an ON signal or an OFF signal based on the label information, specifies a target light source to be tracked depending on the decoding result, determines direction information (pan, tilt, focus) and a rotation direction (plus, minus) of the motor, and outputs these signals to the motor control unit 37.

The motor control unit 37 generates instruction signals Sp, St and Sf for controlling the rotational speed of any one of the motors M based on the reception signal Sm. Hereinafter, when the instruction signals Sp, St and Sf are not particularly distinguished, the instruction signals Sp, St and Sf are simply referred to as the instruction signal S. The instruction signal S output to the motor drive circuit 38 by the motor control unit 37 includes an instruction for the rotation direction of the motor M. For example, if the instruction signal S is switched from plus to minus, the rotation direction of the motor M is reversed.

The motor drive circuit 38p drives the pan motor Mp at the rotational speed in response to the instruction signal Sp. The pan motor Mp adjusts the illumination direction L of the lighting appliance 34 leftward or rightward.

The motor drive circuit 38t drives the tilt motor Mt at the rotational speed in response to the instruction signal St. The tilt motor Mt adjusts the illumination direction L of the lighting appliance 34 upward or downward.

The motor drive circuit 38f drives the focus motor Mf at the rotational speed in response to the instruction signal Sf. The focus motor Mf adjusts the focal length of the lighting appliance 34 forward or backward.

Note that the present embodiment illustrates an example where all of pan, tilt and zoom states of the lighting appliance 34 are adjusted (controlled), but any one of the pan, tilt and zoom states may be adjusted (controlled). Further, a broadcast appliance such as a monitoring camera or a camera for broadcasting may be used as a control target appliance to adjust (control) states such as pan, tilt and zoom states. Furthermore, a projector as typified by a liquid crystal projector, a DLP projector (R), and the like may be used as a control target appliance to adjust (control) states such as focus and a projection angle on a screen by the motor.

Herein, a device including the communication device (including the remote control device 10 and the CMOS sensor 20) and an appliance (a camera, a projector, etc.) whose state varies by tracking the remote control device 10 is referred to as a variable device.

Figure 6:
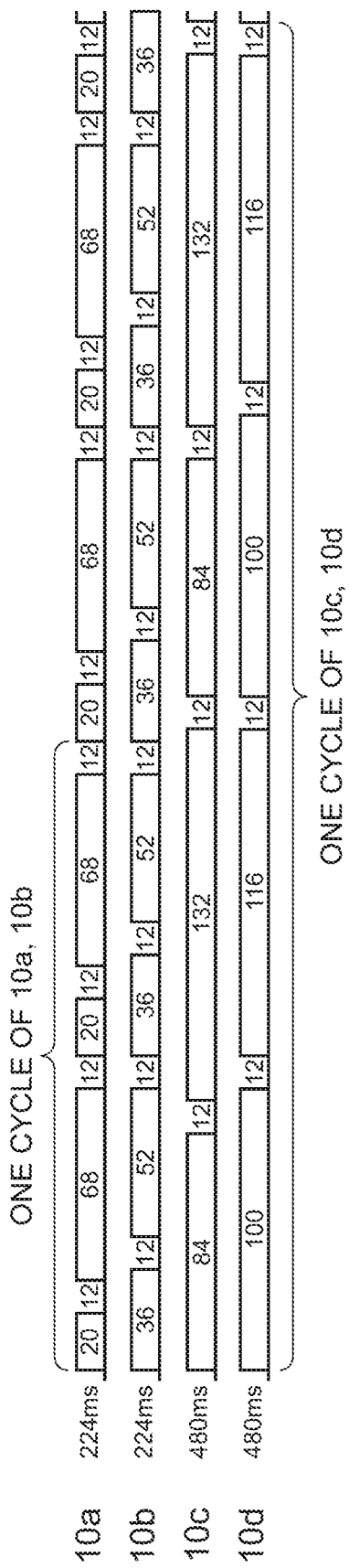
FIG. 6 Pulse patterns of transmission signals from the remote control devices according to the present invention.

FIG. 6 illustrates pulse patterns of transmission signals from the remote control devices 10a to 10d.

In the remote control device 10a, the pulse pattern includes a first ON period (20 ms) and a second ON period (68 ms), which are repeated alternately, and an OFF period (12 ms) is included between the first ON period and the second ON period. As described above, since a sampling time T of the CMOS sensor 20 is 8 ms, the CMOS sensor 20 detects the ON signal twice or three times (which indicates that the remote control device 10a is turned on) in the first ON period (20 ms=2.5 T). For example, if sampling is performed at 8 ms and 16 ms, the CMOS sensor 20 detects the ON signal twice, and if sampling is performed at 3 ms, 11 ms, and 19 ms, the CMOS sensor 20 detects the ON signal 3 times. Further, the CMOS sensor 20 detects the ON signal 8 times or 9 times in the second ON period (68 ms=8.5 T) and detects the OFF signal at least once (which indicates that the remote control device 10a is turned off) in the OFF period (12 ms=1.5 T).

In the remote control device 10b, the pulse pattern includes the first ON period (36 ms) and the second ON period (52 ms), which are repeated alternately. Therefore, the CMOS sensor 20 detects the ON signal 4 times or 5 times in the first ON period (36 ms=4.5 T) and detects the ON signal 6 times or 7 times in the second ON period (52 ms=6.5 T).

In the remote control device 10c, the pulse pattern includes the first ON period (84 ms) and the second ON period (132 ms), which are repeated alternately. Therefore, the CMOS sensor 20 detects the ON signal 10 times or 11 times in the first ON period (84 ms=10.5 T) and detects the ON signal 16 times or 17 times in the second ON period (132 ms=16.5 T).

In the remote control device 10d, the pulse pattern includes the first ON period (100 ms) and the second ON period (116 ms), which are repeated alternately. Therefore, the CMOS sensor 20 detects the ON signal 12 times or 13 times in the first ON period (100 ms=12.5 T) and detects the ON signal 14 times or 15 times in the second ON period (116 ms=14.5 T).

Since the remote control devices 10a to 10d have the same OFF period of 12 ms, the CMOS sensor 20 detects the OFF signal at least once in the OFF period.

As described above, the first ON period and the second ON period are more than twice as long as the sampling time T, and the first ON period and the second ON period are different from each other. Accordingly, the ON signal can be detected twice or more in each of the first ON period and the second ON period. Since the OFF period is longer than the sampling time T, the OFF signal can be detected once or more in the OFF period.

Further, the remote control devices 10a to 10d include respectively different first ON periods and different second ON periods, which makes it possible to reduce the possibility of false detection in the remote control devices 10a to 10d.

Preferably, the first ON period and the second ON period are (n+0.5)×T and the OFF period is 1.5 T, where T is the sampling time and n is an integer of 2 or more. Through use of these settings, even when the sampling start of the CMOS sensor 20 is not synchronized with the pulse pattern of each of the remote control devices 10a to 10d, the CMOS sensor 20 can reliably detect the ON signal twice or more in each of the first ON period and the second ON period and can reliably detect the OFF signal once or more in the OFF period.

As long as the first ON period and the second ON period are more than twice as long as the sampling time T and different from each other, the first ON period and the second ON period may be 2.1 T, for example. As long as the OFF period is longer than the sampling time T, the OFF period may be 1.1 T, for example.

It is preferable for the CMOS sensor 20 to perform detection, assuming that a period including two first ON periods and two second ON periods is one cycle. In the case of the pulse pattern illustrated in FIG. 6, one cycle of each of the remote control devices 10a and 10b is 224 ms and one cycle of each of the remote control devices 10c and 10d is 480 ms.

Figure 7:
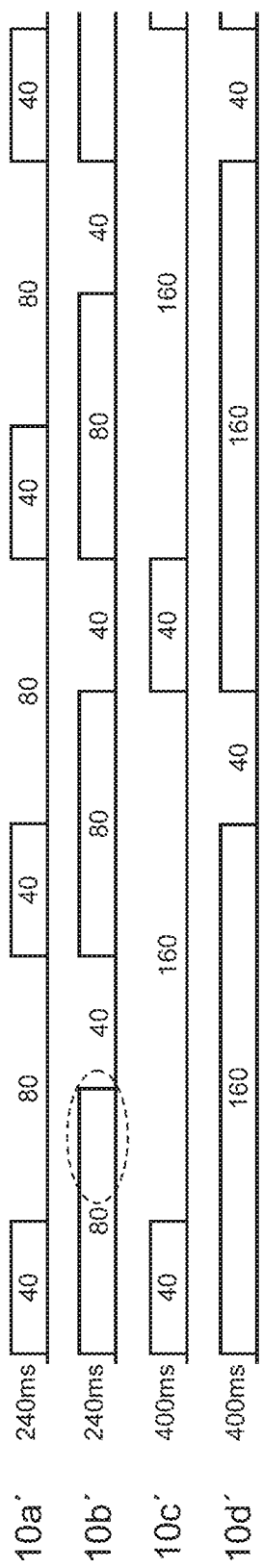
FIG. 7 Pulse patterns of transmission signals from remote control devices according to a Comparative Example.

FIG. 7 illustrates pulse patterns of transmission signals from remote control devices according to a Comparative Example.

In a remote control device 10a', the pulse pattern includes the ON period (40 ms) and the OFF period (80 ms), which are repeated alternately. Accordingly, the CMOS sensor 20 detects the ON signal 5 times or 6 times in the ON period (40 ms=5 T) and detects the OFF signal 10 times or 11 times in the OFF period (80 ms=10 T).

In a remote control device 10b', the pulse pattern includes the ON period (80 ms) and the OFF period (40 ms), which are repeated alternately. Accordingly, the CMOS sensor 20 detects the ON signal 10 times or 11 times in the ON period (80 ms=10 T) and detects the OFF signal 5 times or 6 times in the OFF period (40 ms=5 T).

A case is assumed: although the remote control device 10b' transmits the above-described pulse pattern, when the user carrying the remote control device 10b' substantially moves or when the signal transmission unit of the remote control device 10b' is hidden, the CMOS sensor 20 cannot detect the ON signal in a portion indicated by a dashed circle in FIG. 7. In this case, assuming that a period including one ON period and one OFF period is one cycle, the CMOS sensor 20 cannot distinguish the remote control devices 10a' and 10b'.

Therefore, according to the present invention, it is possible to reduce the possibility of false detection in the remote control devices by increasing the complexity of the pulse pattern using two ON signals with different widths as illustrated in FIG. 6.

Further, as illustrated in a remote control device 10*c'*, if the OFF period (160 ms) is longer than the ON period (40 ms), the problem of false detection due to the replacement as described above is likely to occur.

Therefore, according to the present invention, it is preferable that the OFF period be shorter than each of the first ON period and the second ON period.

Note that there is a possibility that false detection may occur due to light signals, such as sunlight, from light sources different from the remote control device 10. Therefore, it is possible to reduce the possibility of false detection by increasing the complexity of the pulse pattern.

The control unit 22 of the CMOS sensor 20 can allocate labels in consideration of not only the above-described pulse pattern, but also a detected area of a light source or a change rate of a coordinate.

For example, even when the CMOS sensor 20 detects a predetermined pattern of the remote control device 10*a* as illustrated in FIG. 6, if the sensor light receiving area where the CMOS sensor 20 has received light from the light source greatly varies, or if the coordinate (position) of the light source greatly varies, the label 1 cannot be allocated to the detected light source, and it is determined that the light source is not an object to be tracked (the tracked object is lost). This configuration makes it possible to further reduce the possibility of false detection by performing detection with higher accuracy.

Further, on the premise that the remote control device 10 is carried by the user and present on the stage or the like and thus not present in the vicinity of the ceiling, if direction information about a tilt exceeds a predetermined threshold, or if the moving light 30 receives label information indicating that the vicinity of the ceiling is illuminated, the variable control unit 35 of the moving light 30 can also disregard the label information. Through use of this configuration, the moving light 30 installed on the ceiling can avoid erroneously recognizing a light source of a lighting appliance installed near the same ceiling as the light source of the remote control device 10.

The present invention is not limited to the above-described embodiments and can be modified and implemented without departing from the scope of the present invention. Examples of modifications include the following (a) to (c).

(a) The plurality of remote control devices 10*a* to 10*d* is not indispensable. A plurality of pulse patterns may be stored in the signal storage unit 12 of a single remote control device, and the pulse patterns may be switched by a pulse pattern selection switch.

(b) The number of pulse patterns is not limited to four. Two, three, five, or more pulse patterns may be used.

(c) The sensor is not limited to a CMOS sensor and is not particularly limited as long as the sensor can detect light. Any type of sensor may be used.

LIST OF REFERENCE SIGNS

10, 10*a*, 10*b*, 10*c*, 10*d* remote control device
11 control unit
12 signal storage unit
13 signal transmission unit
20 CMOS sensor (sensor)
21 signal detection unit
22 control unit
30 moving light
31 clockwise/counterclockwise rotation unit
34 lighting appliance
35 variable control unit
36 communication unit
37 motor control unit
38*p*, 38*t*, 38*f* motor drive circuit
100 lighting device
Mp pan motor
Mt tilt motor
Mf focus motor
Sm reception signal
Sp, St, Sf instruction signal

The invention claimed is:

1. A remote control device for transmitting a light signal having a pulse pattern to be detected by a sensor, wherein
the pulse pattern includes a first ON period, a second ON period and an OFF period between the first ON period and the second ON period, the first ON period and the second ON period being repeated alternately,
the first ON period and the second ON period are more than twice as long as a sampling time T of the sensor,
the first ON period and the second ON period are different from each other, and
the OFF period is longer than the sampling time T.

2. The remote control device according to claim 1, wherein
the first ON period and the second ON period are (n+0.5)×T and
the OFF period is 1.5 T,
where T is the sampling time and n is an integer of 2 or more.

3. A communication device comprising:
the remote control device according to claim 1; and
a sensor for detecting a light signal transmitted by the remote control device.

4. The communication device according to claim 3, wherein
the sensor assumes a period including two of the first ON periods and two of the second ON periods to be one cycle.

5. The communication device according to claim 3, wherein
the sensor detects the light signal based on a detected area of a light source or a change rate of a coordinate.

6. A variable device comprising:
the communication device according to claim 3; and
an appliance whose state varies by tracking the remote control device based on information from the sensor.

7. A lighting device comprising:
the communication device according to claim 3; and
a moving light for tracking and illuminating the remote control device based on information from the sensor.

8. The lighting device according to claim 7, wherein
the moving light disregards the detected light signal when direction information about a tilt exceeds a predetermined threshold.

* * * * *